May 23, 1950 M. L. EICHEL 2,509,088
HOLDER FOR X-RAY FILMS AND THE LIKE
Filed Jan. 31, 1947 2 Sheets-Sheet 2
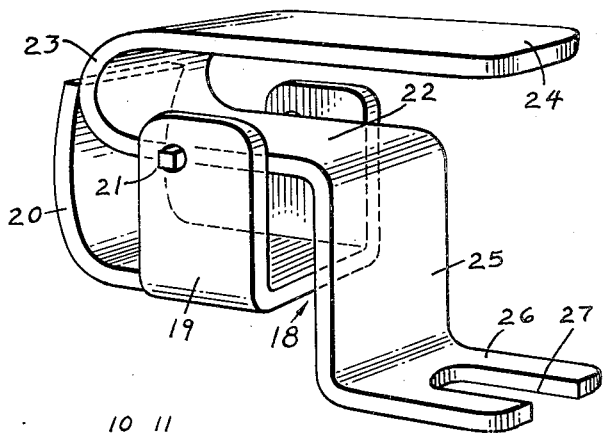
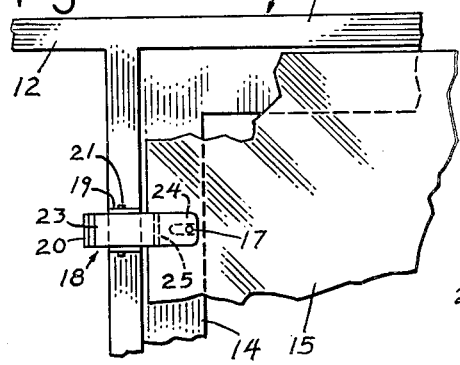
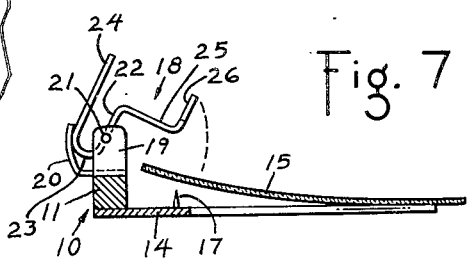
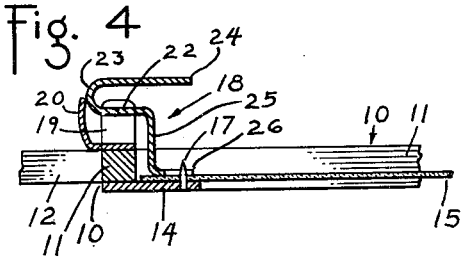
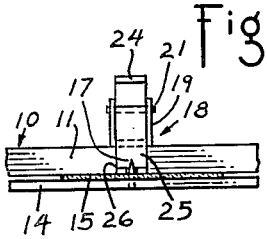
MARGARET L. EICHEL
INVENTOR.
BY
G. Lorenze Miller Patented May 23, 1950

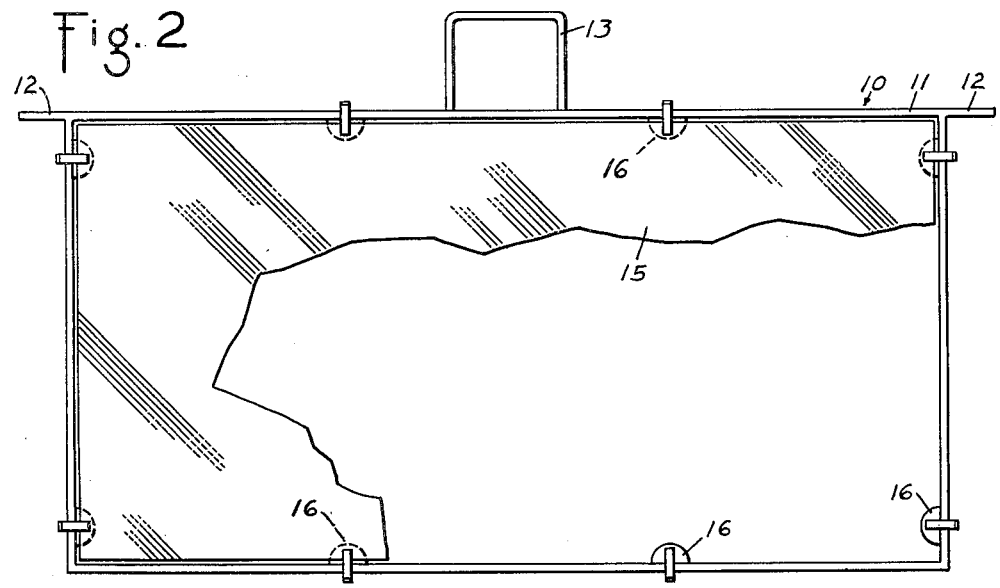
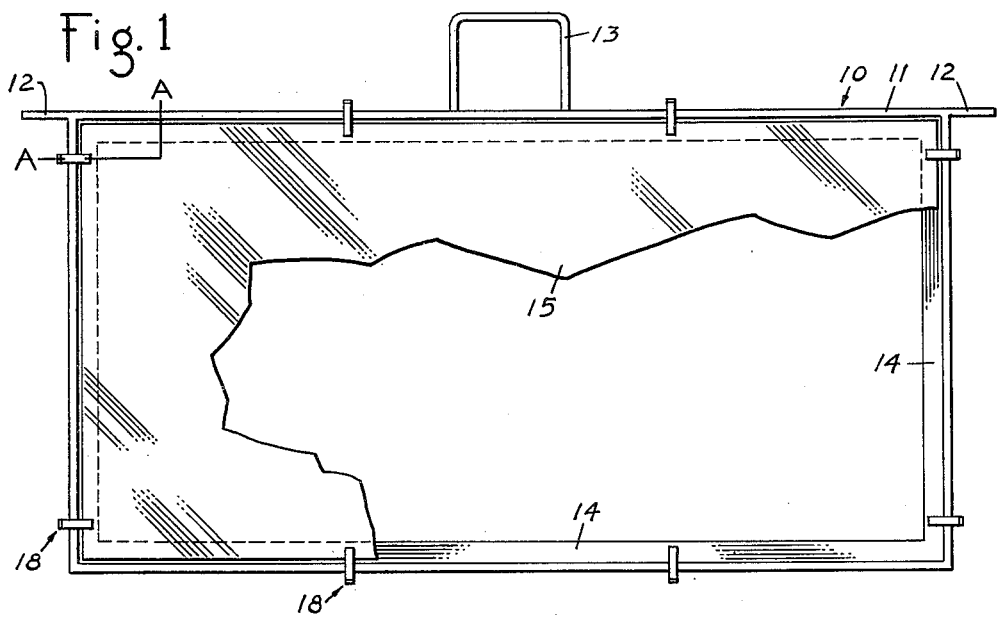

2,509,088

UNITED STATES PATENT OFFICE 2,509,088

HOLDER FOR X-RAY FILMS AND THE LIKE

Margaret L. Eichel, Decatur, Ill.

Application January 31, 1947, Serial No. 725,445

3 Claims. (Cl. 95—100)

This invention relates to holders for detachably mounting X-ray films and the like to hold them in a straight flattened out and unfolded and unrolled condition for the purpose of immersion in the developing or fixing solution or the washing water or liquid in a container or tank provided for the purpose.

An object of the invention is to simplify and make practical and efficient a frame structure having easily and effectively manipulable clip elements or fastening devices to detachably yet securely engage and retain marginal portions of a film without injury to the rest of the film body or interfering with the proper development, fixing and washing of the film, the structure itself being of light weight yet strong and durable and conveniently handled and used in the containers or tanks of the regular run of or specially provided film developing, fixing and washing apparatus.

Other objects and advantages to be attained will hereinafter more fully appear in the following description.

Without absolute limitation thereto the invention, more specifically, has more particularly to do with the clip or film retaining provision of the frame. So, too, a practical but non-limiting exemplification of the invention is illustrated in the accompanying drawings, wherein Figure 1 is a plan view of one structural form of film holding frame in accordance with the invention, a portion of the applied film being broken away to expose an underlying part of the frame structure;

Figure 2 is a similar view of a modified form of frame structure;

Figure 3 is a perspective view, on a greatly enlarged scale, of a clip or film-retainer element detached from the frame of the device;

Figure 4 is a fragmentary sectional view, taken on or about the line A—A of Figure 1 and on a somewhat enlarged scale, in the region of a film retainer clip, the clip being shown in closed film retaining position;

Figure 5 is a fragmentary plan view of one corner portion of the frame and the parts shown in Figure 4;

Figure 6 is a fragmentary sectional view taken at right angles to the showing in Figure 4; and Figure 7 is a view similar to Figure 4 but showing the film-retainer clip in open position, out of engagement with the film, and the film disengaged from the impaler pin.

Referring now to the drawings in detail, the numeral 10 designates, generally, a rectangular frame of rust-proof and acid resistant material throughout, for example, stainless steel or else a suitable plastic material having the requisite lightness with strength and durability for the purpose intended.

As shown, the longitudinal side and transverse end rails of the frame 10 are of square cross-section, as at 11. The frame may or may not have end extensions 12 in line with one of its longitudinal sides (see Figures 1 and 2.) However, it is so provided for practical purposes, in that said end extensions 12 can rest on suitable supports that may be provided in or on the film developing, fixing or washing tank so that the frame can hang vertically immersed in the liquid contents of the tank. The frame may also be provided with a bail-type or other suitable handle 13 at one side, preferably the longitudinal side at the ends of which the extensions 12 project as shown in Figures 1 and 2.

In the form shown in Figures 1 and 4 through 6, the frame 10 is provided with a continuous flat flange plate 14 along its longitudinal side and transverse end rails, the same to support the entire marginal portion of a film 15 to be developed, fixed and washed as will be later more fully described. However, as shown in Figure 2, the continuous flange plate 14 may be eliminated and instead a plurality of separate spaced apart lugs or tongues 16, preferably of substantially semi-circular form as shown, may be provided to support the marginal portion of the film at intervals throughout the length thereof. In either case, sharpened impaler pens or studs 17 are provided on the flange plate 14, at intervals throughout its length, or on the respective lugs or tongues 16.

In cooperative relation to each impaler pin or stud 17 a releasable clip or film-retainer 18 is provided. As shown more clearly in Figures 3 to 7, inclusive, each clip or film-retainer includes a substantially U-shape bracket 19 having a slightly curved, upstanding, lateral tongue extension 20 which is quite stiff and form-retentive yet inherently resilient so as to have a releasable holding-spring-effect for a movable film engaging and holder element to be now described.

The upstanding ear or leg portions of the U-shape bracket 19 are apertured in transverse alinement to receive and afford bearings for trunnions or pivot studs 21 provided at opposite sides of the intermediate flight 22 of an angularly rebent pivotal element 23. One end portion 24 of this element 23 is rebent in parallel relation to said intermediate flight 22 and extended longitudinally so as to produce a fingerpiece for leverage in manipulation of the element conveniently to open and closed positions. In both the opened and closed positions of said element 23 its rounded connecting portion between the intermediate flight 22 and the rebent fingerpiece 24 is pressed continually by the spring tongue portion 20 of the supporting and bearing bracket 19. This provision yieldably holds the element 23 in either position and permits manual forced movement of the element from one position to the other at the will of the operator.

The element 23 is bent at a right angle from its intermediate flight 22, as at 25, and the extreme end portion is again bent at a right angle, as at 26 and extended parallel to the plane of said intermediate portion 22. This end portion 26, in the closed position of said element 23, is moved close to the underlying portion of the flange plate 14 or the lug or tongue 16, as the case may be, and thus presses upon the adjacent marginal portion of the film 15 resting thereunder on the part 14 or 16.

An opening 27 is provided in the said presser end portion 26 of the element 23. This opening 27 may be provided in any desirable manner to clear the impaler pin or stud 17. As shown, the opening 27 is in the form of an open-ended slot, thus producing a spaced pair of parallel fingers to press on the film at opposite sides of the impaler pin or stud 17.

In use, the frame 10 is placed in a convenient position on a flat surface or other suitable support. The clips or retainers 23 are then opened (see Figure 7) and the film 15 is placed in the frame with its marginal portion resting upon the flange plate 14 or the lugs or tongues 16. With the film thus placed, the clips or retainers 23 are closed and pressed by the operator's fingers against the finger-pieces 24, thus forcing the end portions 26 of the clips or retainers against the film (see Figure 4) and causing each of the impaler pins to pierce the film which is thereby held stretched and flattened out and unfolded and unrolled in the frame for immersion as indicated in Figures 1 and 2.

The novel construction and arrangement of the device of the present invention is not only such that the film is readily and easily applied to the frame for immersion but it is as readily and easily removed, and at the same time the holding of the film at its marginal portions is such that there is no injury to the major body portion of the film nor interference with its proper development, fixing and washing.

While the illustrated structure is a practical exemplification of the invention, modification and change is contemplated within the spirit and scope of the appended claims. Therefore, the invention is not limited to the specific construction and arrangement shown.

What is claimed is:

1. A film holder of the character and for the purpose described, the same comprising a rigid open rectangular frame having integral inwardly extending supporting portions on its longitudinal sides and transverse ends to receive and support the marginal portions of a film, within the confines of the frame, said inwardly extending film supporting portions having upstanding impaler pins to puncture the film as its marginal portion is pressed upon said supporting portions of the frame, a bracket member formed as a part of the frame in proximity to each impaler pin, a pivotal retainer clip mounted on each bracket member, and tensioning means carried by said bracket member for frictionally engaging said clip, said slip being retained by said tensioning means releasably in opened and closed positions and having a presser portion engaging and pressing the film in the closing movement of the clip whereby to cause puncturing of the film and its impalement on the associated impaler pin.

2. A film holder as set forth in claim 1, wherein the retainer clip supporting bracket is substantially U-shape with its pair of leg members upstanding, and the clip comprises a one-piece rebent flat strip member including an elongated intermediate portion with a rebent finger extension paralleling said intermediate portion and the connecting portion between said intermediate and finger portions being under continual pressure contact of the tensioning means which releasably holds the clip in its opened and closed positions, a portion of the clip being bent at right angles to the said intermediate portion and the remainder of the clip constituting the presser portion of the clip being bent at right angles to the other mentioned right angular portion and extending parallel to the plane of said intermediate portion, said presser portion having an opening located so that it clears the associated impaler pin in the closed position of the clip.

3. In a film holder of the character described, a substantially rectangular frame having an inwardly facing film supporting shoulder, said film supporting shoulder being an integral part of said rectangular frame, a film piercing pin extending outwardly from said shoulder, and a film retaining clip mounted on said frame adjacent the pin for cooperation with the latter in securing a film to the frame, said clip including a U-shaped bracket member having its bight portion formed with a rebent extension, and a substantially U-shaped presser member cooperating with said pin and pivotally connected to the leg portions of the U-shaped bracket member, said rebent extension constantly and frictionally engaging the bight portion of the pivoted presser member for releasably holding the latter in cooperative and non-cooperative positions with respect to said pin.

MARGARET L. EICHEL.

REFERENCES CITED

The following references are of record in the file of this patent:

UNITED STATES PATENTS

| Number | Name | Date |
|---|---|---|
| 942,641 | Hesson | Dec. 7, 1909 |
| 1,836,142 | Waller | Dec. 15, 1931 |
| 1,854,931 | Gollomb | Apr. 19, 1932 |
| 1,932,946 | Wolf | Oct. 31, 1933 |
| 1,955,575 | Buck | Apr. 17, 1934 |
| 2,001,213 | Pearson | May 14, 1935 |
| 2,078,078 | Hood | Apr. 20, 1937 |
| 2,151,429 | Klopp | Mar. 21, 1939 |
| 2,352,601 | Burke | July 4, 1944 |